Figure 1:
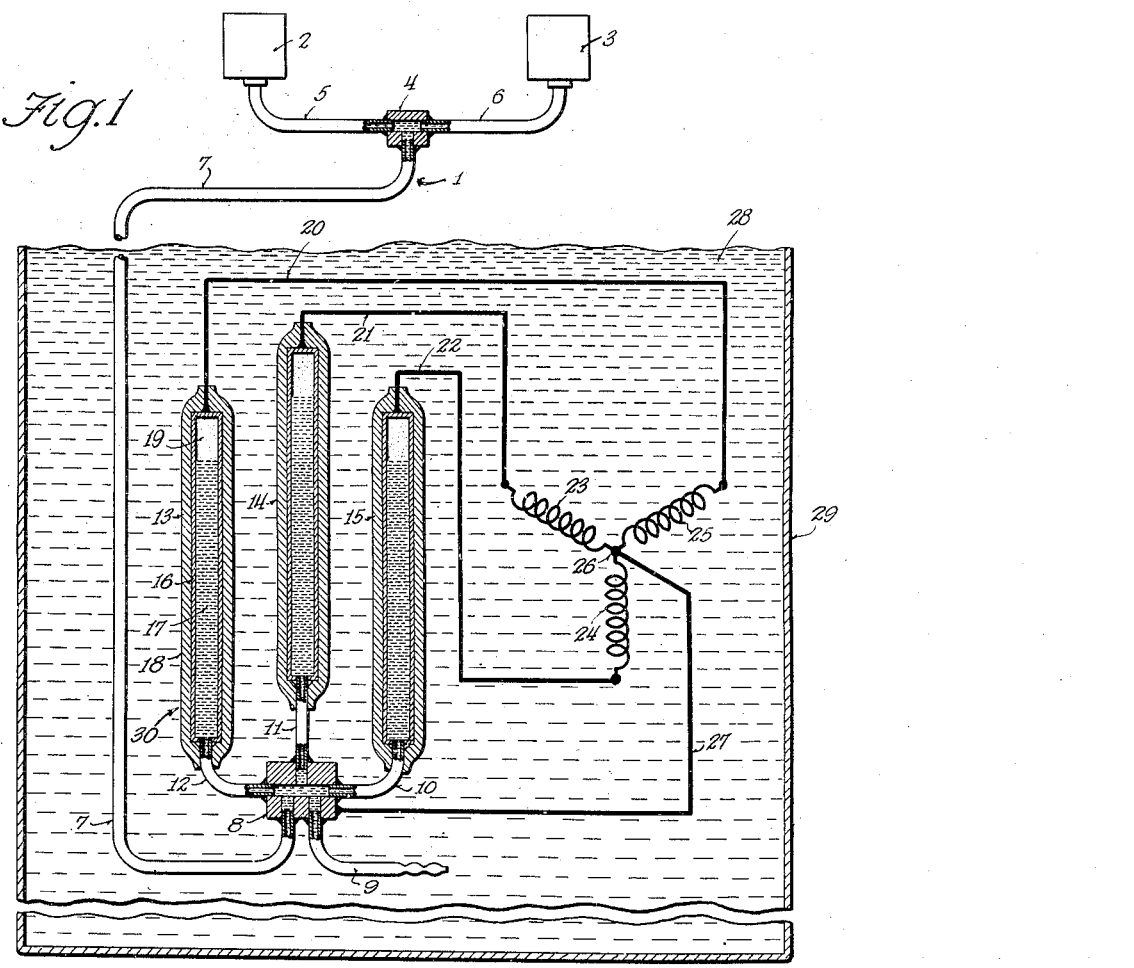

Feb. 13, 1945.   L. H. MATTHIAS   2,369,363
CONTROL DEVICE FOR ELECTRICAL EQUIPMENT
Filed May 5, 1941

INVENTOR
LYNN H. MATTHIAS
BY Walter S. Pfeifer
ATTORNEY

Patented Feb. 13, 1945

2,369,363

UNITED STATES PATENT OFFICE 2,369,363

CONTROL DEVICE FOR ELECTRICAL EQUIPMENT

Lynn H. Matthias, Fox Point, Wis., assignor to Allen-Bradley Company, Milwaukee, Wis., a corporation of Wisconsin Application May 5, 1941, Serial No. 391,939

14 Claims. (Cl. 175—294)

This invention relates to a control device for multiple load circuits and to a control device that is particularly suitable as a protective device for polyphase transformers.

The object of this invention is to secure an improved control device for disconnecting a group of load circuits from a source of electric power upon the attainment of predetermined load conditions by any single load circuit.

A further object is to secure a control device for a number of load circuits in which a single controlling relay is sensitive throughout the operating range of the load circuits to the circuit operating under the most severe predetermined load condition.

A further object is to secure a control device for disconnecting a group of load circuits from a source of power in which a single relay responds at a predetermined rate related to the rate of change of temperature of the copper windings of the load circuit operating under the most severe load condition.

A further object is to obtain a control device for a group of load circuits having a single control relay sensitive throughout the operating range of the load circuits to the circuit operating under the most severe predetermined load condition, whereby, control of the most severe predetermined load condition for all circuits is obtained by adjustment of the single relay.

A further object is to obtain an improved and simplified protective device for a group of load circuits having a single control relay sensitive throughout the operating range of the load circuits to the circuit operating under the most severe predetermined load condition, whereby, selective adjustment of the tripping point of the single relay controls the de-energization of all the load circuits when any load circuit attains a selected predetermined load condition.

A further object is to secure a control device for a number of load circuits in which a single pressure operated relay is responsive to vapor pressure means thermally associated with the load circuits to render the relay responsive throughout the operating range of the load circuits to the load circuit operating under the most severe thermal condition.

A further object is to secure a protective device for a polyphase transformer having individual vapor pressure means associated with each phase of the transformer and connected by a common hydraulic connection to a pressure operated element, whereby, the pressure operated element is sensitive throughout the operating range of the transformer to the load condition of the phase operating under the most severe predetermined load condition; and with the essential elements of the device subject to the same ambient conditions, whereby, the response of the device to load conditions is altered in accordance with changes in the ambient conditions.

The control device of this invention includes a single relay adapted to disconnect a group of load circuits from a source of power whenever any load circuit attains a predetermined load condition. The relay has a responsive element influenced by individual condition responsive devices each associated with a single load circuit, whereby, adjustment of the tripping point of the relay is sufficient to control the protection of the group of load circuits.

The load circuits are ordinarily of equal capacity and are associated with identical condition responsive devices that respond equally for the same degree of load. If the load circuits vary in capacity or if it is desired to operate some circuits at higher load levels, the coupling of the condition responsive device with its load circuit can be suitably made by current transformers or other means.

The preferred form of this invention is a protective device utilizing a plurality of metal tubes containing a suitable quantity of volatile liquid and its saturated vapor connected by a common hydraulic connection to a liquid filled pressure switch. The entire system is liquid filled with the exception of the vapor space and each metal tube serves as a temperature responsive device for a separate load circuit. In this device the pressure is determined by the tube operating at maximum temperature. The pressure switch is thus always responsive to the load circuit operating under the most severe load condition.

Figure 2:
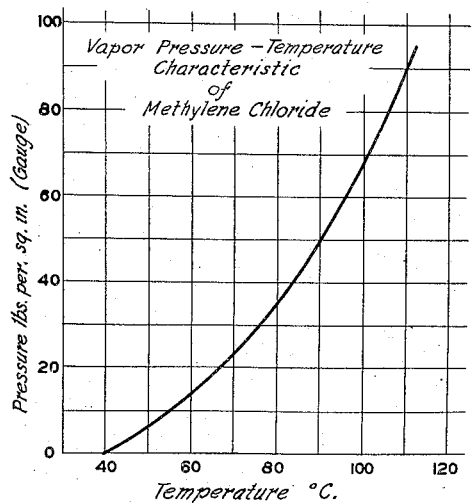

The vapor pressure actuated protective device has proven to be particularly adapted to the protection of large polyphase transformers. A preferred form of the protective device is shown in simplified form on the attached drawing, in which Figure 1 shows in schematic form the essential elements of the device and Figure 2 shows the vapor pressure-temperature characteristic of the volatile liquid used in the preferred form of the invention.

It is well known to those skilled in the art that a closed system containing a limited fill of a suitable volatile liquid develops in the system a pressure definitely related to the maximum temperature at any point in the liquid. This physical property has long been used to produce temperature responsive devices of the so-called vapor-pressure type.

The protective device herein disclosed utilizes the principle of the vapor pressure control device in a new and novel manner, whereby, improved control of a group of load circuits is obtained. The protective device is particularly useful in the protection of polyphase transformers.

As it is normally desirable to disconnect completely, electrical equipment when any point within the unit reaches a definite maximum set temperature, it has been found to be advantageous in accordance with this invention to utilize a vapor pressure device associated with each phase and then to connect by means of a common hydraulic connection the several vapor pressure devices to a single pressure responsive switch. A single pressure operated relay is then responsive to the vapor pressure device subject to the greatest temperature, which is ordinarily designed to be proportional to the temperature of the copper windings of the load circuit operating at maximum temperature.

The preferred form of this invention is shown schematically in Figure 1 in a manner suitable for the protection of a three phase transformer. The transformer and associated equipment are not shown on the drawing. This equipment can be any of that used in the art. The transformer that is to be protected is normally enclosed within a tank containing oil or other suitable liquid. Identical current transformers are connected in each load circuit, whereby, currents proportional to the current in each load circuit of the transformer are available for operating the protective device. The secondary windings of the current transformers are shown in Figure 1 and are designated as coils 23, 24 and 25. The transformer, current transformers and vapor pressure devices are all contained in the same tank of oil and are thus all influenced by the same ambient conditions. A section of the tank 29 containing oil 28 is shown in Figure 1 with the secondary windings 23, 24 and 25 of the current transformers and the vapor pressure device 30 surrounded by oil 28.

The protective device 1 comprises a pressure operated circuit breaker relay 2, a pressure operated alarm 3, a vapor pressure device 30 and the secondary windings 23, 24 and 25 of the current transformers.

The vapor pressure device 30 includes three identical vapor pressure bulbs 13, 14 and 15. Each comprises a tube 16 made of stainless steel containing a limited liquid fill 17 of methylene chloride. The balance of the fill 19 comprises saturated vapor of methylene chloride. The relation of the liquid fill 17 to the vapor fill 19 of the system is determined by the liquid used, the ambient temperature and the desired range of operation of the device. It is desirable that throughout the entire range of operation of the device that at no time does the vapor fill of the system equal zero. Each vapor pressure bulb is connected by means of equal lengths of metal tubing 10, 11 and 12 to common metal manifold block 8. A tube 7 hydraulically connects manifold block 8 with manifold block 4 and branching from manifold block 4 are connecting tubes 5 and 6 to which are connected pressure operated relay 2 and alarm relay 3.

Vapor pressure bulbs 13, 14 and 15, pressure operated relays 2 and 3 and the hydraulic connections form a sealed system. The system is properly filled through connection 9 and sealed by closing the end of connection 9. The liquid and vapor fill shown in Figure 1 is the condition that exists when the three bulbs 13, 14 and 15 are at the same temperature. Whenever any single tube acquires a temperature greater than the others, vaporization occurs in the tube operating at the higher temperature and condensation occurs in the tubes at the lower temperature. An increase in vapor pressure within the system accompanies this change and the increase in pressure is determined solely by the increase in temperature of the tube at maximum temperature.

The vapor pressure device 30 must be designed so that the zone of maximum temperature is adjacent the liquid and not adjacent the vapor space at a point appreciably away from the liquid-vapor interface. This condition would result in super heating the vapor and consequent alteration in the response of the device. In the device herein disclosed the tubes 13, 14 and 15 are substantially vertical with the hydraulic connection at the bottom and the vapor space at the top. The temperature distribution is quite uniform along the length of the tube except for the extreme ends which are at a lower temperature. In the operation of the device it is important that the vapor space never reaches the lower part of the tube where a condition would be reached in which the liquid-vapor interface would be at a temperature less than a portion of the vapor. This condition is avoided by adjusting the fill and design of the tubes so that under the most severe condition of operation the vapor space of the effective tube is substantially one-half the length of the tube.

The three secondary windings 23, 24 and 25 of the current transformer are connected in star at 26. Each of the secondaries 23, 24 and 25 are connected through a stainless steel tube 16 that forms the bulb of each of the vapor pressure devices 13, 14 and 15. The connection for secondary 23 includes star connection 26, connector 27, the manifold block 8, connection tube 11, stainless steel tube 16 of the vapor pressure device 14 and connector 21. The remaining two secondaries are connected by means of their respective connectors 20 and 22, connecting tubes 12 and 10 and a stainless steel tube 16 in each of the two vapor pressure devices 13 and 15. Thus the vapor pressure devices 13, 14 and 15 are each influenced proportionally to the temperature of the copper windings of their associated load circuits. The vapor pressure device 13, 14 or 15 attaining the maximum temperature determines the vapor pressure in the closed system and the relays 2 and 3 are influenced throughout the range of operation by the load circuit operating under the most severe load condition.

The stainless steel tubes 16 of each of the three vapor pressure devices 13, 14 and 15 are surrounded by a thermal insulating material 18. The thermal insulating material 18 is for the purpose of altering the rate of heat transfer from the surrounding liquid medium 28 to the tube 16. The insulation of the tubes 16 from the surrounding liquid medium 28 can either be reduced or increased beyond that shown in the attached drawing to obtain the proper operating characteristics desired in the device.

In the operation of the device as the current increases in any load circuit, a proportional increase in current occurs in the current transformer. The heat generated within the stainless steel tube 16 is then proportional to the temperature rise of the copper windings of the associated load circuit. By connecting the secondaries 23, 24 and 25 of the current transformers in star at 26, it is possible to directly connect the stainless steel tubes 16 in the electrical circuit. This results in the obtainment of a protective device having a very quick response to changes in load condition of the device connected thereto. If the application requires a delayed response it can be obtained by utilizing a separate heater for the stainless steel tubes 16 properly spaced therefrom or any other suitable change in thermal design.

In the preferred form shown, it has been found advantageous to use methylene chloride as the temperature responsive medium. The vapor pressure temperature characteristic curve of methylene chloride is shown in Figure 2. There are other liquids having similar characteristics that are suitable for this work. Methylene chloride is herein shown as representative of a volatile fluid that is suitable for use in the preferred form shown.

Two pressure operated relays 2 and 3 are shown and are responsive to the load circuit operating under the most severe load condition. In normal use the pressure operated alarm 3 is so adjusted that when the maximum temperature of any of the temperature responsive devices 13, 14 and 15 is 90° C., an alarm is sounded to warn the attendant of the approach of the breaker setting of relay 2 that operates at a 100° C. Upon operation of the circuit breaker relay 2, the power supply to the main transformer is interrupted protecting the transformer against damage.

The preferred form shown is equally applicable to other systems having polyphase load conditions. Wherever there is a possibility that the load condition of the various phases or load circuits might vary, a protective device of this type is particularly advantageous. The single controlling relay is only responsive to the load circuit operating under the most severe load condition thus affording protection not on the basis of total load but on the basis of the load condition of the phase or load circuit operating under the most severe predetermined conditions of load.

Protective devices utilizing the principle of operation of the device herein described can be arranged for various electrical applications. The design of the temperature responsive devices, the thermal relation of the responsive devices to ambient conditions and related equipment, and the coupling of each responsive device to its associated load circuit can be altered to provide protection against a wide variety of conditions. In some applications the control relay is sensitive throughout its operating range to the load circuit operating at maximum load. In other applications the response may be to the circuit operating under the most severe load condition, the circuit operating under maximum percent of rated load or the circuit operating with its windings at maximum temperature.

I claim as my invention:

1. A control device for a plurality of load circuits comprising a single relay controlling the supply of electric power to a group of load circuits, a plurality of temperature responsive fluid-tight containers containing a volatile fluid each thermally associated with a single load circuit, and a closed pressure responsive element for said relay in connection with all of the said containers actuated by the vapor pressure of the fluid contained in the containers; said pressure responsive element of said relay sensitive, throughout the operating range of said load circuits, to the vapor pressure of the fluid contained in the containers associated with the load circuit operating under the most severe predetermined load condition.

2. A control device for a plurality of load circuits comprising a single relay controlling a group of load circuits and having a pressure operated element, a plurality of temperature responsive vapor pressure means each of which is responsive to the load condition of a single load circuit, and a hydraulic connection connecting said pressure operated element with each of said vapor pressure means, whereby, said pressure operated element is sensitive throughout the load range of said load circuits to the circuit operating under the most severe load condition.

3. A control device for a plurality of load circuits comprising a plurality of pilot circuit means each responsive to the load condition of a single load circuit, a plurality of temperature responsive vapor pressure devices each responsive to the thermal condition of a single load circuit, and a single relay controlling said load circuits and having a pressure operated element hydraulically connected to said vapor pressure devices, whereby, said pressure operated element is sensitive throughout the load range of said circuits to the load circuit operating under the most severe thermal condition.

4. A control device for a plurality of load circuits comprising a plurality of pilot load circuit means each thermally responsive to the load condition of a single load circuit, a plurality of temperature responsive vapor pressure means each of which is responsive to the thermal condition of a single pilot load circuit, a single protective relay controlling said load circuits and having a pressure operated element hydraulically connected to said vapor pressure means, whereby, said pressure operated element is sensitive throughout the load range of said load circuits to the load circuit operating under the most severe load condition, and a common ambient condition for said load circuits, pilot load circuits and vapor pressure means, whereby, said vapor pressure means are altered in their response to the load condition of each load circuit in accordance with changes in said common ambient condition.

5. A control device for a plurality of load circuits comprising a plurality of pilot circuit means insulated from said load circuits and each responsive to the load condition of a single load circuit, a temperature responsive vapor pressure device associated with each pilot circuit means, and a single relay controlling said load circuits and having a pressure operated element hydraulically connected to said vapor pressure devices; each of said vapor pressure devices consisting of a tube-like body of electrically conducting material filled with a suitable quantity of volatile liquid; each of said tubes being sealed at one end and the opposite ends thereof hydraulically connected through an electrical conducting member; said pilot circuit means having one common electrical connection with the hydraulically connected end of said vapor pressure devices and each of said pilot circuits having an electrical connection with the sealed end of a single vapor pressure device, whereby, each of said pilot circuits and the tube-like body of a single vapor pressure device form a closed electrical circuit in which the power dissipated in the tube-like body is proportional to the load condition of said pilot load circuit and said pressure operated element is sensitive throughout the load range of said load circuits to the pressure of the vapor pressure device coupled to the load circuit operating under the most severe load condition.

6. A control device comprising a single relay for controlling a group of load circuits, a temperature responsive vapor pressure device for each load circuit comprising a fluid-tight container and each container thermally associated with a load circuit, and a pressure operated element for said relay hydraulically connected to each vapor pressure device; said vapor pressure devices containing a suitable fill of a volatile liquid, which liquid develops vapor pressure effective to operate said relay in accordance with the most severe thermal condition of any load circuit.

7. A control device comprising a pressure operated device effective to control a group of load circuits and a temperature responsive vapor pressure device hydraulically connected to said pressure operated device; said vapor pressure device comprising a plurality of similar temperature responsive vapor pressure bulbs each thermally associated with and responsive to the thermal condition of a load circuit and each hydraulically connected to the pressure operated device; and said pressure operated device, vapor pressure bulbs and hydraulic connection constituting a closed system with a suitable limited fill of a volatile liquid with said closed system subjected to the vapor pressure of the liquid at maximum temperature.

8. A control device comprising a pressure operated device effective to control a group of load circuits and a temperature responsive vapor pressure device hydraulically connected to said pressure operated device; said vapor pressure device comprising a plurality of similar temperature responsive vapor pressure bulbs each thermally associated with and responsive to the thermal condition of a load circuit and each hydraulically connected to the pressure operated device; said vapor pressure bulbs having associated therewith heat insulating material to affect the rate of response to changes in load condition to conform to predetermined control conditions; and said pressure operated device, vapor pressure bulbs and hydraulic connection constituting a closed system with a suitable limited fill of a volatile liquid with said closed system subjected to the vapor pressure of the liquid at maximum temperature.

9. A control device comprising a pressure operated device effective to control a group of load circuits and a temperature responsive vapor pressure device hydraulically connected to said pressure operated device; said vapor pressure device comprising a plurality of similar temperature responsive vapor pressure bulbs each comprising a vertical tube-like body closed at the top end with the bottom ends hydraulically connected to the pressure operated device and each uniformly heated by means associated with and responsive to the thermal condition of a load circuit; and said pressure operated device, vapor pressure bulbs and hydraulic connection constituting a closed system suitably filled with a volatile liquid and its saturated vapor, so that throughout the operating range of said load circuits the saturated vapor space in any tube never reaches a temperature greater than the temperature of the liquid, and the pressure in the closed system is determined by the vapor pressure of the liquid at maximum temperature, whereby, control of the group of load circuits by said pressure operated device is in accordance with the most severe thermal condition of any load circuit.

10. In a protective device for a circuit element of an electrical instrumentality the combination which comprises a hermetically sealed fluid containing system having a pressure responsive part and a substantially non-expansible heatable part, a volatile-condensible fluid substance contained within said system under such pressure as to be in part in liquid phase and in part in vapor phase, said vapor phase portion being contained under working conditions entirely within said heatable part and occupying less than the total volume thereof, the remaining volume of said system including the remaining volume of said heatable part being occupied by said substance in liquid phase, said heatable part being adapted to hold said vapor and additional vapor resulting from heating of said heatable part substantially at the temperature of said heatable part and in contact with that portion of said subtsance in liquid phase contained within said heatable part, a protective device adapted to be actuated by said pressure responsive part and electrical means correlated with a circuit element of said electrical instrumentality for supplying heat to said heatable part at a rate measured by the load carried by said circuit element.

11. In a protective device for protecting a circuit element of an electrical instrumentality immersed in a tank containing a coolant the combination which comprises a hermetically sealed fluid containing system having a pressure responsive part and a substantially non-expansible heatable part immersed in the coolant contained in said tank, a volatile-condensible fluid substance contained within said system under such pressure as to be in part in liquid phase and in part in vapor phase, said vapor phase portion being contained under working conditions entirely within said heatable part and occupying less than the total volume thereof, the remaining volume of said system including the remaining volume of said heatable part being occupied by said substance in liquid phase, said heatable part being adapted to hold said vapor and additional vapor resulting from heating of said heatable part substantially at the temperature of said heatable part and in contact with that portion of said substance in liquid phase contained within said heatable part, a protective device adapted to be actuated by said pressure responsive expansible part, and electrical means correlated with a circuit element of said electrical instrumentality for supplying heat to said heatable part at a rate measured by the load carried by said circuit element.

12. In a protective device for protecting a circuit element of an electrical instrumentality the combination comprising a hermetically sealed fluid containing system having a pressure responsive part and a substantially non-expansible chamber having walls composed of electrically conducting material, a volatile-condensible fluid substance contained within said system under such pressure as to be in part in liquid phase and in part in vapor phase, said vapor phase portion being contained under working conditions entirely within said non-expansible chamber and occupying less than the total volume thereof, the remaining volume of said system including the remaining volume of said chamber being occupied by said substance in liquid phase, said chamber being adapted to hold said vapor and any additional vapor formed from said liquid phase in contact with said liquid phase within said chamber, a protective device adapted to be actuated by said pressure responsive part, and electrical means correlated with a circuit element of said electrical instrumentality for causing an electric current to flow through the walls of said chamber and to heat the same at a rate measured by the load carried by said circuit element.

13. In a protective device for an electrical instrumentality having several circuit elements the combination which comprises a hermetically sealed fluid containing system having a pressure responsive part and a plurality of inter-connected substantially non-expansible heatable parts, a volatile-condensible fluid substance contained within said system under such pressure as to be in part in liquid phase and in part in vapor phase said vapor phase portion being contained under working conditions within one or more of said heatable parts occupying therein less than the total volume thereof, the remaining volume of said system including the remaining volume of said heatable parts being occupied by said substance in liquid phase, each said heatable part being adapted to hold the vapor contained therein substantially at the temperature of said heatable part and in contact with that portion of said substance in liquid phase contained within said heatable part, a protective device adapted to be actuated by said pressure responsive part, and a plurality of electrical means each correlated with one of said circuit elements of said electrical instrumentality and with one of said heatable parts adapted to supply heat to said heatable parts at rates measured by the load carried by said respective circuit elements.

14. In a protective device for the several circuit elements of a multiphase electrical instrumentality the combination comprising a plurality of windings one for each of said phases and correlated therewith, said windings being connected to form a set with a common point, a hermetically sealed fluid containing system having a pressure responsive part and a plurality of substantially non-expansible electrically conducting chambers hydraulically and electrically connected at a junction point, a volatile-condensible fluid substance contained within said system under such pressure as to be in part in liquid phase and in part in vapor phase said vapor phase portion being contained under working conditions within one or more of said chambers and occupying less than the total volume thereof, the remaining volume of said system including the remaining volume of said chambers being occupied by said substance in liquid phase, said chambers being adapted to hold the vapor contained therein at substantially the temperature of said chambers and in contact with the substance in liquid phase contained therein, a protective device adapted to be actuated by said pressure responsive part, means forming electrical connection between said common point and said junction point, and means forming a separate electrical connection between each chamber and one of said windings.

LYNN H. MATTHIAS.